United States Patent
Gong et al.

(10) Patent No.: US 10,873,398 B1
(45) Date of Patent: Dec. 22, 2020

(54) DISPERSION MONITOR APPARATUS

(71) Applicant: Molex, LLC, Lisle, IL (US)

(72) Inventors: Lifu Gong, San Jose, CA (US);
Gongjian Hu, Seaside, CA (US); Yi Liao, Fremont, CA (US); Glenn Lee, Lisle, IL (US); Guojiang Hu, Fremont, CA (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/525,586

(22) Filed: Jul. 30, 2019

(51) Int. Cl.
*H04B 10/2525* (2013.01)
*G02B 6/02* (2006.01)

(52) U.S. Cl.
CPC ..... *H04B 10/2525* (2013.01); *G02B 6/02219* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,980,738 | B1* | 12/2005 | Frankel | H04B 10/2525 398/147 |
| 2003/0151789 | A1* | 8/2003 | Hamoir | H04B 10/07955 359/239 |
| 2003/0174311 | A1* | 9/2003 | Wilson | H04B 10/25133 356/73.1 |
| 2004/0190823 | A1* | 9/2004 | Leuthold | H04B 10/299 385/27 |
| 2005/0238362 | A1* | 10/2005 | Sekiya | H04B 10/0795 398/147 |
| 2007/0177877 | A1* | 8/2007 | Sekine | H04J 14/02 398/147 |
| 2010/0322622 | A1* | 12/2010 | Shukunami | H04B 10/07953 398/26 |
| 2012/0308227 | A1* | 12/2012 | Komaki | H04B 10/2569 398/25 |
| 2013/0195452 | A1* | 8/2013 | Hui | H04Q 11/0005 398/50 |

* cited by examiner

*Primary Examiner* — Omar S Ismail
(74) *Attorney, Agent, or Firm* — Molex, LLC

(57) ABSTRACT

An optical signal transmission apparatus and a method are provided. The apparatus may include a set of optical transmitters, each optical transmitter configured for transmission of light signals at one or more wavelengths of light. The apparatus may include an output port configured for transmission of the light signals through a span of optical fiber. The apparatus may use an input port configured to receive other transmissions of light signals through the span of optical fiber. The apparatus may include a set of light detectors, each light detector configured to detect a time delay or phase characteristic associated with the one or more wavelengths of light. The apparatus may include a processor configured to determine a metric based on the detected time delay or phase characteristic.

19 Claims, 13 Drawing Sheets

|  | Normal Mode | Calibration Mode 1 | Calibration Mode 2 |
|---|---|---|---|
| SW1 | State 1<br>(340I to 340C) | State 0<br>(340G to 340C) | State 0<br>(340G to 340C) |
| SW2 | State 1<br>(340I to 340D) | State 0<br>(340H to 340D) | State 0<br>(340H to 340D) |
| XC | Don't Care | State 1<br>(340E to 340G)<br>(340F to 340H) | State 0<br>(340E to 340H)<br>(340F to 340G) |

FIG. 4

| DELAY | DELAY SEGMENTS | DELAY | DELAY SEGMENTS |
|---|---|---|---|
| TX1 Delay | Electric to Optical Conversion<br>340A to 340P | TX2 Delay | Electric to Optical Conversion<br>340B to 340P |
| RX1 Delay | 340I to 340C<br>Optical to Electrical Conversion | RX2 Delay | 340I to 340D<br>Optical to Electrical Conversion |
| UE1 TX1 to UE2 RX1 | Electric to Optical Conversion<br>340A to 340P<br>340P to LINE OUT<br>Transmission Span<br>LINE IN to 340I<br>340I to 340C<br>Optical to Electrical Conversion | UE1 TX2 to UE2 RX2 | Electric to Optical Conversion<br>340B to 340P<br>340P to LINE OUT<br>Transmission Span<br>LINE IN to 340I<br>340I to 340D<br>Optical to Electrical Conversion |

FIG. 5

| DELAY | DELAY SEGMENTS | DELAY | DELAY SEGMENTS |
|---|---|---|---|
| TX1 to RX1 | Electric to Optical Conversion<br>340A to 340C<br>Optical to Electrical Conversion | TX2 to RX2 | Electric to Optical Conversion<br>340B to 340D<br>Optical to Electrical Conversion |

FIG. 6 (Calibration Mode 1)

| DELAY | DELAY SEGMENTS | DELAY | DELAY SEGMENTS |
|---|---|---|---|
| TX1 to RX2 | Electric to Optical Conversion<br>340A to 340D<br>Optical to Electrical Conversion | TX2 to RX1 | Electric to Optical Conversion<br>340B to 340C<br>Optical to Electrical Conversion |

FIG. 7 (Calibration Mode 2)

DISPERSION MONITOR APPARATUS

BACKGROUND

Field

The present disclosure relates to the field of fiber optic dispersion monitoring systems, and more particularly, but not exclusively, to dispersion monitoring systems used within fiber optic transmission systems.

Background

Communication systems may rely on fiber optics as a transmission medium. When the signals propagate through media such as optical fibers, the waveform of the signal may deteriorate due to cumulative dispersion. Many optical signal transmission systems, however, do not include adaptable elements for monitoring such dispersive phenomenon. Accordingly, there is a need for improved systems and methods for monitoring dispersion within an optical communication system.

SUMMARY

In an aspect of the disclosure, an optical signal transmission apparatus is provided. The apparatus may include a set of optical transmitters, each optical transmitter configured for transmission of light signals at one or more wavelengths of light. The apparatus may include an output port configured for transmission of the light signals through a span of optical fiber. The apparatus may have an input port configured to receive other transmissions of light signals through the span of optical fiber. The apparatus may include a set of light detectors, each light detector configured to detect a delay characteristic associated with the one or more wavelengths of light. The apparatus may include a processor configured to determine a metric based on the detected delay characteristic.

In another aspect of the disclosure, an optical signal transmission apparatus is provided. The apparatus may include a set of transmitter means, each transmitter means configured for transmission of light signals at one or more wavelengths of light. The apparatus may include an output means configured for transmission of the light signals through a span of optical fiber. The apparatus may include an input means configured to receive other transmissions of light signals through the span of optical fiber. The apparatus may include a set of light detector means, each light detector means configured to detect a delay characteristic associated with the one or more wavelengths of light. The apparatus may include a processing means configured to determine a time metric based on the decoded delay characteristic.

In another aspect of the disclosure, a method of an optical signal transmission apparatus is provided. The method may include receiving a plurality of light signals at a plurality of wavelengths of light. The method may include detecting, at a plurality of light detectors, a delay characteristic of each of the plurality of light signals. The method may include determining, at a processor, a time metric based on detecting the delay characteristics.

BRIEF DESCRIPTION OF THE DRAWINGS

FIG. 4 is a table illustrating sample modes of operation for the module 125, in accordance with one or more aspects of the disclosure.

FIG. 5 is a table illustrating sample signal transmission delays for various segments of module 125 in a normal operating mode (e.g., for transmission between UEs), in accordance with one or more aspects of the disclosure.

FIG. 6 is a table illustrating sample signal transmission delays for various segments of module 125 in a first calibration mode ("Calibration Mode 1"), in accordance with one or more aspects of the disclosure.

FIG. 7 is a table illustrating sample signal transmission delays for various segments of module 125 in a second calibration mode ("Calibration Mode 2"), in accordance with one or more aspects of the disclosure.

DETAILED DESCRIPTION

Figure 1:
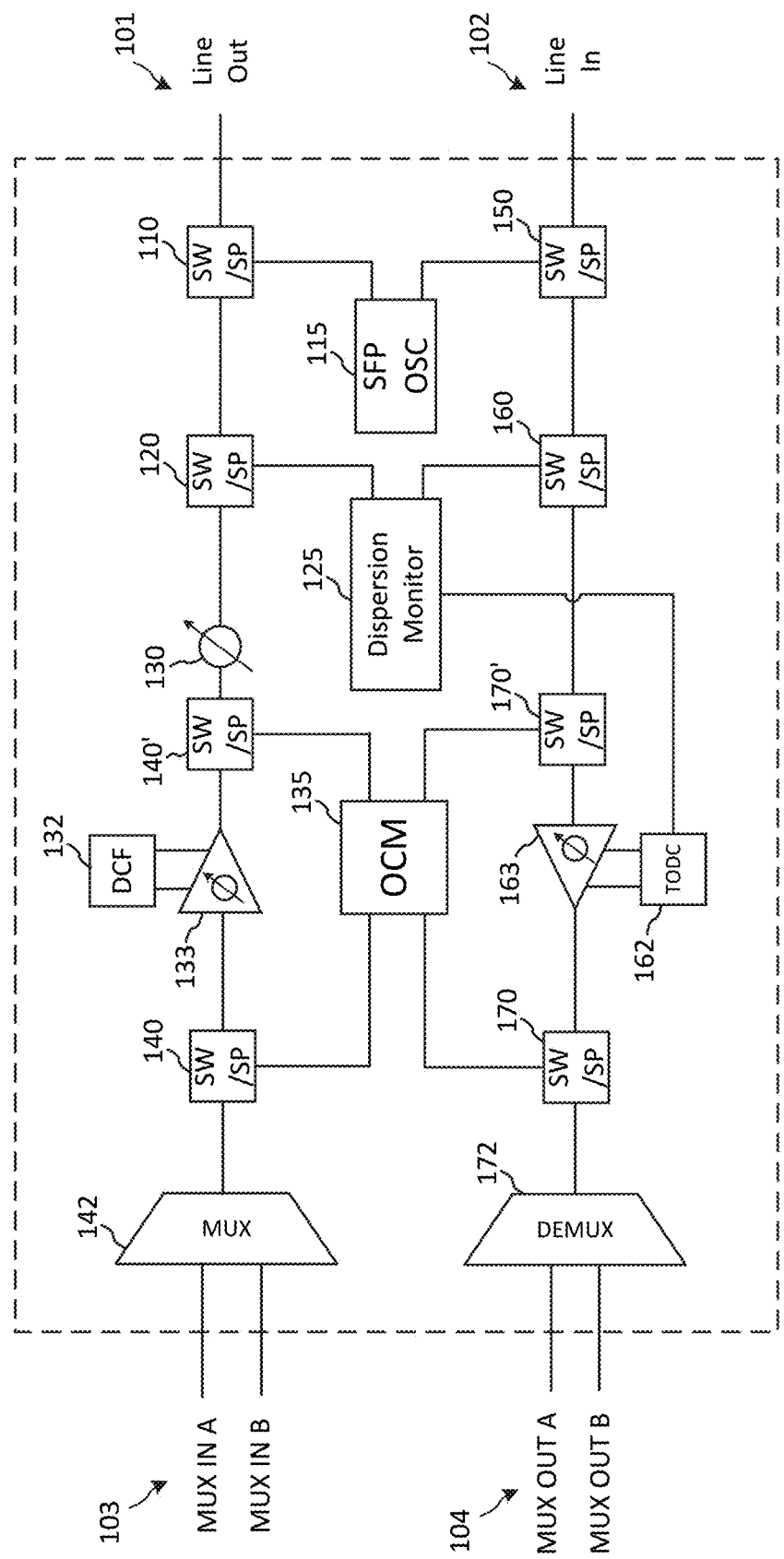
FIG. 1 is a diagram illustrating an exemplary fiber optic transmission module or user equipment 100 for optical communications, in accordance with one or more aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. It will, however, be apparent to those skilled in the art that these concepts may be practiced without these specific details. In some instances, well known structures and components are shown in block diagram form in order to avoid obscuring such concepts.

Several aspects of the communication systems will now be presented with reference to various apparatuses and methods. These apparatuses and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), application-specific integrated circuits (ASIC), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), solid-state devices (e.g., solid-state drives or solid-state disks (SSD), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

The exemplary methods and apparatuses discussed infra are applicable to any of a variety of fiber optic communications systems and dispersion monitoring systems, such as for example, fiber optic devices incorporating various fiber communication standards. To simplify the discussion, the exemplary methods and apparatuses are discussed within the context of these example embodiments. One of ordinary skill in the art, however, would understand that the exemplary methods and apparatuses are applicable more generally to a variety of other fiber optic transmission systems. Communications systems and transmissions systems may be used interchangeably in the disclosure herein.

Disclosed herein are systems and methods for monitoring signals in optical transmission systems including monitoring dispersion within the systems. The apparatus or monitoring module performing the methods may refer to a submodule of user equipment or the user equipment itself, or any portion thereof.

Fiber transmission systems may include runs of fiber. Dispersion may be an inherent aspect of light transmission through fiber optics. Dispersion may include light or the wave front varying with the frequency of light. Over a distance, the light signal may exhibit dispersion phenomena. In the context of data, dispersion may cause a symbol or signal to become sufficiently broadened that one signal overlaps with neighboring signals. Signal transmission errors may occur in such instances. It may be beneficial to include dispersion monitoring elements in these optical signal transmission systems to monitor and account for dispersion in the systems.

FIG. 1 is a diagram illustrating an exemplary fiber optic transmission module or user equipment (UE) 100 for optical communications. UE 100 may include elements for transmitting and receiving fiber optic signals. UE 100 may include a Line In 101 connection for receiving the signals, e.g., from another UE 100 or other sources of optical signals. UE 100 may include a Line Out 102 connection for transmitting the signals, e.g., to another UE 100 or other receivers of optical signals. UE 100 may include connections for local signal input or output. For example, the MUX IN A/B 103 and MUX OUT A/B 104 connections may couple to user connections that may communicate, e.g., user data or control signals to the UE 100 via MUX 142 and DEMUX 172. MUX 142 and DEMUX 172 may provide input and output signals, respectively. UE 100 may include switches or splitters configured for coupling signals from one to two or more connections. The elements may be configured, e.g., based on system design, user preferences, etc. As illustrated in FIG. 1, the UE 100 may include a small form-factor pluggable (SFP) optical supervisory channel (OSC) module 115. The OSC module 115 may be configured to send and receive signals for setup and configuration of the UE 100 or other UEs in communication with the UE 100. The configuration signals may include data and other characteristics including, e.g., dispersion qualities, various specification attributes of the UE 100. The OSC module 115 may be coupled to switch or splitter (SW/SP) 110, 150 for sending and receiving, respectively, data such as configuration data, parameter data, etc., to and from other UEs. These parameter values may be quantities that are determined during manufacturing. For example, the manufacturer of the UE 100 may determine specifications and parameters of the UE 100, and may store the data on a memory of the UE 100. Parameter information and/or other data received at the OSC module 115 may be used to configure the UE 100 during run time. In another embodiment, UE 100 may include delay elements (not shown) to synchronize the various components of the UE 100. For example, the delay elements may synchronize signals transmitted from two or more lasers of the UE 100.

Dispersion module 125 may determine dispersion characteristics for controlling the tunable optical dispersion compensating (TODC) module 162. TODC module 162 may be coupled to variable amplifier 163 to compensate for dispersion in the optical communication lines. UE 100 may include a variable optical attenuator 130 for controlling the signal in the line.

UE 100 may include an optical channel monitor (OCM) 135 configured for optimizing and controlling the power and performance of the UE 100 based on measurements and analysis. For example, OCM 135 may monitor the signals via switches/splitters 140, 140', 170, and 170' in the UE 100, and may use the measurements for controlling, e.g., optical power levels of the various amplifiers and circuit elements. UE 100 may include a dispersion compensating fiber (DCF) module 132 for compensating dispersion in the transmission fiber. UE 100 may include variable amplifiers, such as amplifier 133, for offsetting attenuation due to the various circuit elements such as DCF module 132.

In some embodiments, the fiber optic used for the transmission span may include such types as G.652 or G.652D including those made by Corning such as single mode fiber 28e (SMF 28e, etc.) or G.655 (e.g., Corning® LEAF®, etc.). For example, dispersion may be in the range of 13 to 19 picoseconds/nanometer/kilometer (ps/nm/km) with positive dispersion slope for the type G.652/G.652D fiber. As another example, dispersion may be in the range of around 2 to 10 ps/nm/km with a positive dispersion slope for the type G.655. While any span of fiber is possible, in some embodiments, the span of transmission fiber may be 80 km to 100 km. In some embodiments the measurement accuracy may be better than 20 ps/nm. In some embodiments, the dispersion measurement may be achieved within five minutes or less; in yet other embodiments the dispersion measurement may be achieved within one minute or less. In some embodiments, the module may continuously measure the state of the UE 100 (e.g., dispersion characteristics) for continuous monitoring and configuration. The UE 100 may be in communication with other nodes at various communication bands including those around 1500 nm, e.g., the C-band (or the conventional band of 1530-1565 nanometers (nm)). Some optical fibers may have lower signal transmission losses in this C-band. In other embodiments, any suitable bands or wavelengths of the electromagnetic spectrum may be used according to system design.

In some embodiments, the UE 100 may monitor dispersion based on detecting delays of two or more channelized light sources. Dispersion (e.g., modal dispersion including polarization mode dispersion) may be determined as a differential group delay ($\Delta\tau$ or "delta tau") of a light signal divided by the wavelength difference of the channelized light sources ($\Delta\tau$ or "delta lambda") given by the formula (1) below:

$$\text{Dispersion} = \frac{\Delta\tau}{\Delta\lambda}, \quad (1)$$

In some embodiments, dispersion may be characterized by a dispersion coefficient associated with a fiber (e.g., associated with an index of refraction). Dispersion in ps/nm may be given by the equation (2) relating the coefficient and length:

$$\text{Dispersion} = D(\lambda) * L = \frac{d\tau}{d\lambda} = A * \lambda - \frac{C}{\lambda^3}, \quad (2)$$

where $D(\lambda)$ is a dispersion coefficient (e.g., chromatic or modal dispersion), L is a total traveling path length or span (e.g., measured in meters, feet, etc.), A, C may be fiber-dependent coefficients (or curve fitting parameters) for operation at a $\lambda$ wavelength, and Dispersion may be further simplified with a very good approximation, e.g., in the C-band, by Dispersion=A*$\lambda$. While the dispersion equations above associated with an index of refraction is provided using one model for the dispersion coefficient, it will be noted that it may be possible to model the index of refraction based on any suitable formula including, for example, the Cauchy, Sellmeier, Kettler-Helmholtz-Drude equations, etc.

The dispersion relationship may also be expressed as equation (3) below:

$$D(\lambda) * L = \text{Dispersion}(\lambda_m) = \frac{d\tau}{d\lambda} = \frac{\Delta\tau}{\Delta\lambda} = \frac{\tau*(\lambda_1) - \tau*(\lambda_2)}{\lambda_1 - \lambda_2}, \quad (3)$$

where $$\lambda_m = \frac{\lambda_1 - \lambda_2}{2}.$$

As illustrated by the above equations, dispersion may be a function of the wavelength of light that the system operates in; dispersion may be a function of the length of the span of fiber used in the system. The dispersion at a specific wavelength $\lambda_m$ can be obtained through time delay measurement of 2 light signals at its adjacent wavelengths $\lambda_1$ and $\lambda_2$.

Figure 2:
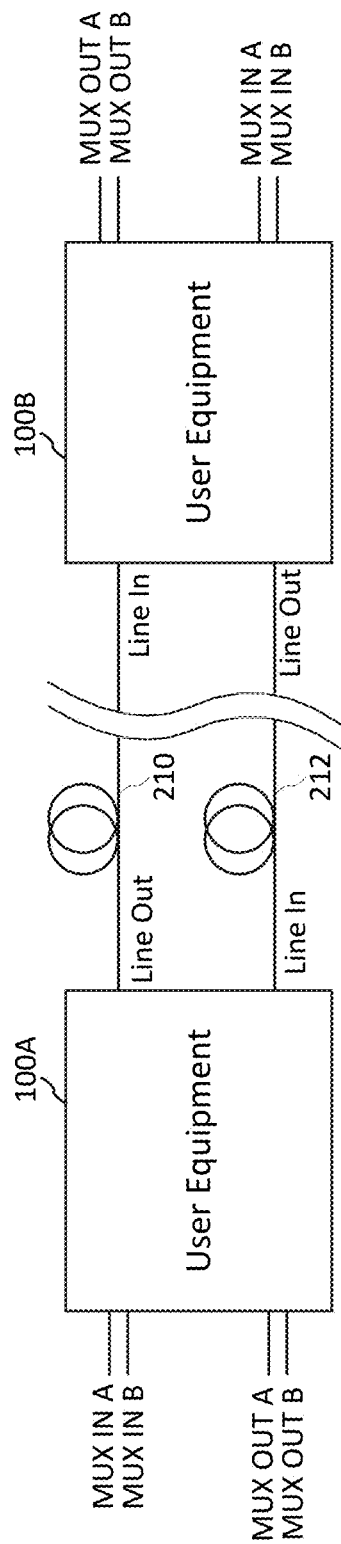
FIG. 2 is a diagram illustrating an exemplary fiber optic communication system including two nodes represented by modules such as user equipment 100 of FIG. 1, in accordance with one or more aspects of the disclosure.

FIG. 2 is a diagram illustrating an exemplary fiber optic communication system 200 including two nodes represented by modules UE 100A, 100B. UEs 100A, 100B may be user equipment 100 of FIG. 1. The communication system may include fiber lines (or transmission lines) 210, 212 coupling the UEs 100A, 100B. The fiber lines 210, 212 may be G.652, G.652D, G.655 or other type of fibers that used to transmit light signals from one location to another location. The span of the lines may be any length, e.g., based on user preferences, system design, protocol limits, etc. In some embodiments, the span of fiber may be 80 km to 100 km.

In some embodiments, the UEs 100A, 100B may exchange equipment parameters (e.g., transmitting or broadcasting parameters) for configuring each respective UE 100A, 100B. For example, UE 100A may include stored parameters (e.g., stored by the module manufacturer), and may send the stored parameters to UE 100B. Likewise, UE 100B may include stored parameters, and may send the stored parameters to UE 100A. In another embodiment, the UEs 100A, 100B may determine the parameters after deployment to the end user's site. The parameters may include delay characteristics, dispersion characteristics, etc. for the UEs 100A, 100B to configure their dispersion compensating elements. In other embodiments, the UEs 100A, 100B may determine the parameters based on calibration tests.

In addition, or in the alternative, UEs 100A, 100B may include delay circuit elements to synchronize signal transmission. In such cases, broadcasting the UE's parameters may not be necessary because the delay circuit elements synchronize the signal transmissions. UEs 100A, 100B may use any combination of these techniques and other suitable techniques for synchronization and dispersion control.

Figure 3:
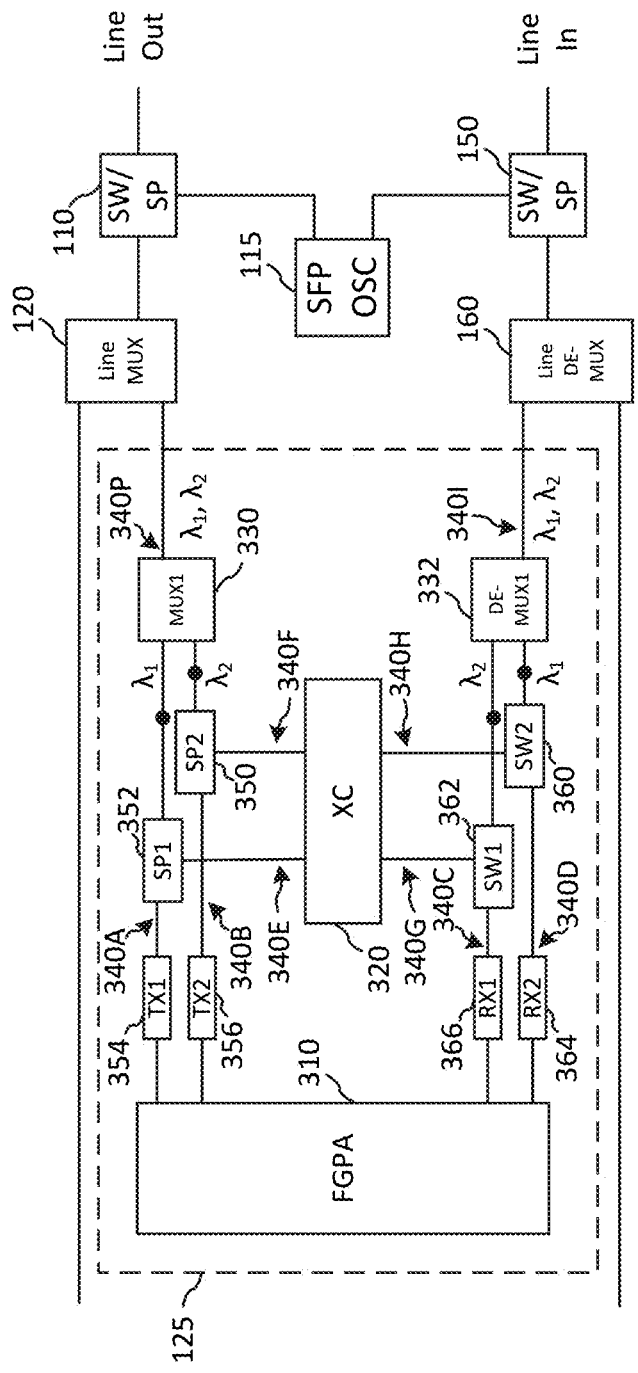
FIG. 3 is a diagram illustrating an exemplary embodiment of a dispersion monitoring module that may be included in an apparatus such as user equipment 100 of FIG. 1, in accordance with one or more aspects of the disclosure.

FIG. 3 is a diagram illustrating an exemplary embodiment 300 of a dispersion monitor (DM) module 125. For example, DM module 125 may be the dispersion monitoring elements of UE 100 of FIG. 1. In FIG. 3, like elements from FIG. 1 are denoted by like reference characters to those of FIG. 1, and some description thereof is omitted herein to avoid redundancy. For example, the DM module 125 within the dotted box may include inputs from the DM module 125 such as the line MUX 120, line DE-MUX 160.

The DM module 125 may be configured to enable self-calibration. For example, the module 125 may be deployed to an end user location or facility without factory calibration. It may be desirable to calibrate at the end user's location due to economic efficiency, environmental characteristics, such as temperature, atmospheric pressure, etc.

In the embodiment shown in FIG. 3, the module 125 may be configured for at least three operating modes. The modes may include a first calibration mode, a second calibration mode, and a normal operating mode. In the normal operating mode, the module 125 may be in a mode, e.g., to function as a fiber optic communication module in communication with one or more other nodes. In the calibration modes, the DM module 125 may determine a set of parameters including operating characteristics of the module 125.

DM module 125 may include MUX 330 for multiplexing input signals from Line Mux 120. DM Module 125 may include DE-MUX 332 for demultiplexing output signals from SW1 362 and SW2 360 to Line DE-MUX 160. DM module 125 may include a processor or FPGA 310 configured for processing and analyzing data including optical signals received at module 125, e.g., via inputs at the UE 100. FPGA 310 may be coupled to one or more other processors (not shown). While the description herein may describe a processor or the processor performing various steps, one skilled in the art will understand that it may be one or more processors performing the various steps. DM module 125 may include one or more signal generators (not shown).

DM module 125 may include a cross connect (XC) 320, e.g., an optical cross-connect, for coupling a set of inputs to a set of outputs. In the example of FIG. 3, the XC 320 has inputs connected to splitter (SP1) 352 and SP2 350, and outputs connected to switch (SW1) 362, SW2 360. XC 320 may be configured to couple splitters 352, 350 to one of switches 362, 360. For example, in one configuration, XC 320 may couple the signal from SP1 352 to SW1 362 and to couple the signal from SP2 350 to SW2 360. In another configuration, XC 320 may couple the signal from SP1 352 to SW2 360 and to couple the signal from SP2 350 to SW1 362. Because SP1 352, SP2 350 direct the signals from the transceivers 352, 356, and SW1 362, SW2 360 direct the signals to the transceivers, by controlling XC 320, the module 125 may be able to determine differences in the signal characteristics for light signal paths from the transmitters 354, 356 to the receivers 364, 366. For example, XC 320 may be able to determine the propagation delays from the transmitters to the receivers and the differences between the propagation delays.

FIG. 4 is a table illustrating sample modes of operation for the module 125, in accordance with one or more aspects of the disclosure. The modes may include a normal operating mode ("Normal Mode"), a first calibration mode ("Calibration Mode 1"), and a second calibration mode ("Calibration Mode 2"). In the normal operating mode, the module 125 may be in a mode, e.g., to function as a module in communication with one or more other nodes. For example, the normal operating mode directs signals from other nodes to the receivers RX1 366, RX2 364 of the module 125. In the calibration modes, the module 125 may determine dispersion, metrics, times delays, parameters, other characteristics, etc. of the module 125. The calibration modes cause the circuits of the module 125 to redirect signals from the transmitters TX1 354, TX2 356 to the receivers of the module 125 itself. When the signals are transmitted and received by the module 125 itself, the module 125 may be able to determine the characteristics and time delays for signals to travel through segments of the module 125.

In the normal operating mode, the module 125 may switch SW1 362 to a first state ("State 1") to direct signals from segment 340I to 340C, and SW2 360 to a first state ("State 1") to direct signals from segment 340I to 340D. In the normal operating mode the state of the XC 320 may not affect signals in the module 125 ("don't care") because the signals from the XC 320 are blocked by the switches SW1 362 and SW2 360. By directing the signals from segment 340I to the receivers RX1 366 RX2 364, the module 125 enables external signals (e.g., from other nodes/UEs) to be received by the module 125 and FPGA 310.

In the first calibration mode ("Calibration Mode 1"), the module 125 may switch SW1 362 to a second state ("State 0") to direct signals from segment 340G to 340C, and SW2 360 to a second state ("State 0") to direct signals from segment 340H to 340D. The module may switch the XC 320 to a first state ("State 1") to direct signals from 340E to 340G and signals from 340F to 340H. This mode enables a first path from the transmitters TX1 354, TX2 356 to the receivers RX1 366, RX2 364—i.e., TX1 354 is coupled to RX1 366 and TX2 356 is coupled to RX2 364.

In the second calibration mode ("Calibration Mode 2"), the module 125 may switch SW1 362 to a second state ("State 0") to direct signals from segment 340G to 340C, and SW2 360 to a second state ("State 0") to direct signals from segment 340H to 340D. The module may switch the XC 320 to a second state ("State 0") to direct signals from 340E to 340G and signals from 340F to 340H. This mode enables a second path from the transmitters TX1 354, TX2 356 to the receivers RX1 366, RX2 364—i.e., TX1 354 is coupled to RX2 364 and TX2 356 is coupled to RX1 366.

FIG. 5 is a table illustrating sample signal transmission delays for various segments of module 125 in a normal operating mode (e.g., for transmission between UEs), in accordance with one or more aspects of the disclosure. Table 4 shows six types of delays (e.g., time delay for signal transmission) including delays for transmission segments, receiver segments, and delays from the transmitter to a receiver. The examples below will be described with reference to FIG. 5 and FIG. 3. The signal delay may be a function of the wavelength of the signal, e.g., as discussed above with reference to formulas (1)-(3). The time delays and other characteristics (e.g., dispersion) of the module may be referred to as a metric.

For example, delay for signals transmitted from TX1 354 ("TX1 delay") may include and be the sum of delays from (a) an electrical to optical conversion and (b) segment 340A to segment 340P. Delay for signals transmitted from TX2 356 ("TX2 delay") may include and be the sum of delays from (a) an electrical to optical conversion and (b segment 340B to segment 340P.

For example, delay for signals received at RX1 366 ("RX1 delay") may include and be the sum of delays from (a) segment 340I to 340C and (b) an optical to electrical conversion. Delay for signals received at RX2 364 ("RX1 delay") may include and be the sum of delays from (a) segment 340I to 340D and (b) an optical to electrical conversion.

Signal delay for transmission from a transmitter to a receiver may include the above delays in addition to delays through a transmission span of fiber. For example, delay for signals transmitted from TX1 (e.g., at a first UE) to an RX1 (e.g., at a second UE) ("TX1 to RX1 delay") may include and be the sum of delays from (a) an electrical to optical conversion, (b) segment 340A to segment 340P, (c) segment 340P to LINE OUT, (d) transmission span of fiber, (e) LINE IN to 340I, (f) 340I to 340C, and (g) an optical to electrical conversion. Delays from (a) to (c) may be from the first UE; delays from (e) to (g) may be from the second UE.

For example, delay for signals transmitted from TX2 (e.g., at the first UE) to an RX2 (e.g., at the second UE) ("TX2 to RX2 delay") may include and be the sum of delays from (a) an electrical to optical conversion, (b) segment 340B to segment 340P, (c) segment 340P to LINE OUT, (d) transmission span of fiber, (e) LINE IN to 340I, (f) 340I to 340D, and (g) an optical to electrical conversion. Delays from (a) to (c) may be from the first UE; delays from (e) to (g) may be from the second UE.

The delay times (e.g., "TX1 delay", "TX2 delay", "RX1 delay", "RX2 delay", "TX1 to RX1 delay", "TX2 to RX2 delay") and delay differences (e.g., "TX1 delay" compared to "TX2 delay", "RX1 delay" compared to "RX2 delay", "TX1 to RX1 delay" compared to "TX2 to RX2 delay") among the various segments may enable the UE or module 125 to perform calibration. In addition, or in the alternative, the delay times and delay differences may be sent to other UEs for calibration of the other UEs. Determining the delay characteristics (e.g., the above delay times and differences of the delay times) may be performed during manufacture with the delay characteristics stored in the UE memory. In some embodiments, each of the delay segments in FIG. 5 may be individually determined and stored in the UEs for calibration.

In some embodiments, the transmission span delay may be non-negligible when the transmission span is sufficiently long. In other embodiments, the transmission span delay may be negligible when the transmission span is short (e.g., less than 1 km). In such cases, the delay characteristics of the UEs may be sufficient without needing the delay characteristics of the transmission span.

FIG. 6 is a table illustrating sample signal transmission delays for various segments of module 125 in a first calibration mode ("Calibration Mode 1"), in accordance with one or more aspects of the disclosure. The examples below will be described with reference to FIG. 6 and FIG. 3. The signal delay may be a function of the wavelength of the signal, e.g., as discussed above with reference to formulas (1)-(3). The time delays and other characteristics (e.g., dispersion) of the module may be referred to as a metric.

For example, delay for signals transmitted from TX1 354 ("TX1 to RX1") may include and be the sum of delays from (a) an electrical to optical conversion, (b) segment 340A to segment 340C, and (c) optical to electrical delay. Delay for signals transmitted from TX2 356 ("TX2 to RX2") may include and be the sum of delays from (a) an electrical to optical conversion (b segment 340B to segment 340D, and (c) and optical to electrical conversion. The delay difference may be the difference between the two delays "TX1 to RX1" and "TX2 to RX2", which may be used for calibration of the UE.

FIG. 7 is a table illustrating sample signal transmission delays for various segments of module 125 in a second calibration mode ("Calibration Mode 2"), in accordance with one or more aspects of the disclosure. The examples below will be described with reference to FIG. 7 and FIG. 3. The signal delay may be a function of the wavelength of the signal, e.g., as discussed above with reference to formulas (1)-(3). The time delays and other characteristics (e.g., dispersion) of the module may be referred to as a metric.

For example, delay for signals transmitted from TX1 354 ("TX1 to RX2") may include and be the sum of delays from (a) an electrical to optical conversion, (b) segment 340A to segment 340D, and (c) and optical to electrical delay. Delay for signals transmitted from TX2 356 ("TX2 to RX1") may include and be the sum of delays from (a) an electrical to optical conversion (b segment 340B to segment 340C, and (c) and optical to electrical conversion. The delay difference may be the difference between the two delays "TX1 to RX2" and "TX2 to RX1", which may be used for calibration of the UE.

In some embodiments, error analysis may be used to improve calibration of the UE. For example, multiple measures and taking averages of the measurements may improve the calibration by reducing errors in the measurements.

For example, the error equations (4) to (7) below may be used for averaging and improving the calibration:

$$z = F(x_1, x_2, x_3, x_4), \quad (4)$$

$$dz = \sqrt{\left(\frac{\partial F}{\partial X_1}\right)^2 dx_1^2 + \left(\frac{\partial F}{\partial X_2}\right)^2 dx_2^2 + \ldots + \left(\frac{\partial F}{\partial X_n}\right)^2 dx_n^2}, \quad (5)$$

Further, if:

$$w = x^a y^b z^c, \quad (6)$$

then $$\left(\frac{\Delta w}{w}\right)^2 = \left(a\frac{\Delta x}{x}\right)^2 + \left(b\frac{\Delta y}{y}\right)^2 + \left(c\frac{\Delta z}{z}\right)^2, \quad (7)$$

The accuracy of individual factors may affect the accuracy of the overage equation.

Figure 8:
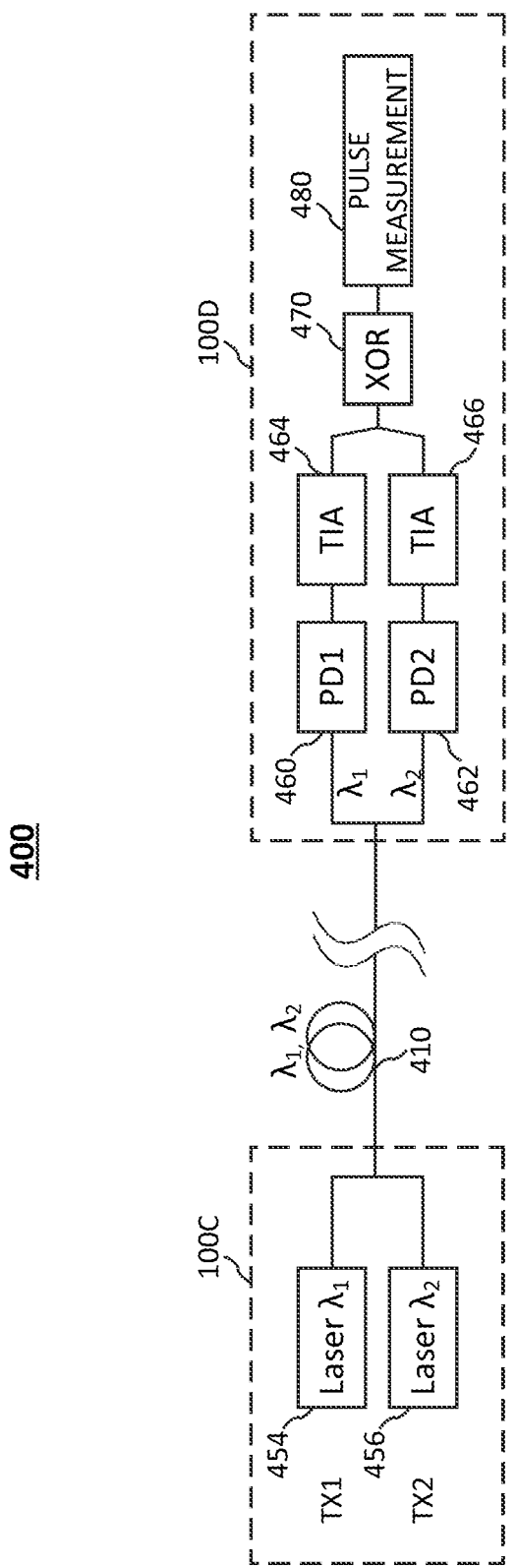
FIG. 8 is a diagram illustrating an exemplary fiber optic communication system including two nodes (represented by modules such as user equipment 100 of FIG. 1) in communication using wavelengths of light, in accordance with one or more aspects of the disclosure.

FIG. 8 is a diagram illustrating an exemplary fiber optic communication system 400 including two nodes. UEs 100C, 100D may be exemplary embodiments including dispersion monitoring modules. In FIG. 8, like elements from FIG. 1 are denoted by like reference characters to those of FIG. 1, and some description thereof is omitted herein to avoid redundancy.

In the example of FIG. 8, the UE 100C's transceivers TX1 454, TX2 456 may be implemented as lasers, each configured for transmission at one or more wavelengths. For example, TX1 454 may transmit a signal pulse A at a first wavelength, $\lambda_1$; TX2 456 may transmit a signal pulse B at the same time in sync with TX1 454 at a second wavelength $\lambda_2$. The two wavelengths may be multiplexed on the transmission line 410, which may be a fiber transmission line with a variable length and variable dispersion profile. At the destination node UE 100D, the signals may be demultiplexed for processing independently at detectors that can convert light signals (e.g., photodiode detectors PD1 460, PD2 462) to electrical signals and through transimpedance amplifiers (TIA) TIAs 464, 466. The signal may then pass through an XOR (exclusive or) circuit 470 before passing to the pulse measurement module 480. Based on the pulse measurement, characteristics of the signals may be determined, include relative time delay of two signals, etc. While the time delay detector circuit is implemented as a combination of a photodiode detectors, transimpedance amplifiers, XOR circuit, and pulse measurement unit, the circuit may be implement using any suitable time delay detector circuit based on user preference or system design. The pulse measurement unit 480 may be a processor or logic unit (for example an FPGA), that may include PLLs (phase lock loops) providing multiple (M) clocks in the same frequency but with each clock being phase shifted by a proportional amount. For example, each clock (also called a sub-clock) may be shifted by 2π/M radians (or 360/M degrees) where M is the number of clocks. The relative time delay of two received pulses (e.g., pulse A and pulse B) can be measured by counting the number of M clock rising edges in between rising edges of pulses A and B, and measurement accuracy can be improved M times better than using only a single clock.

Figure 9:
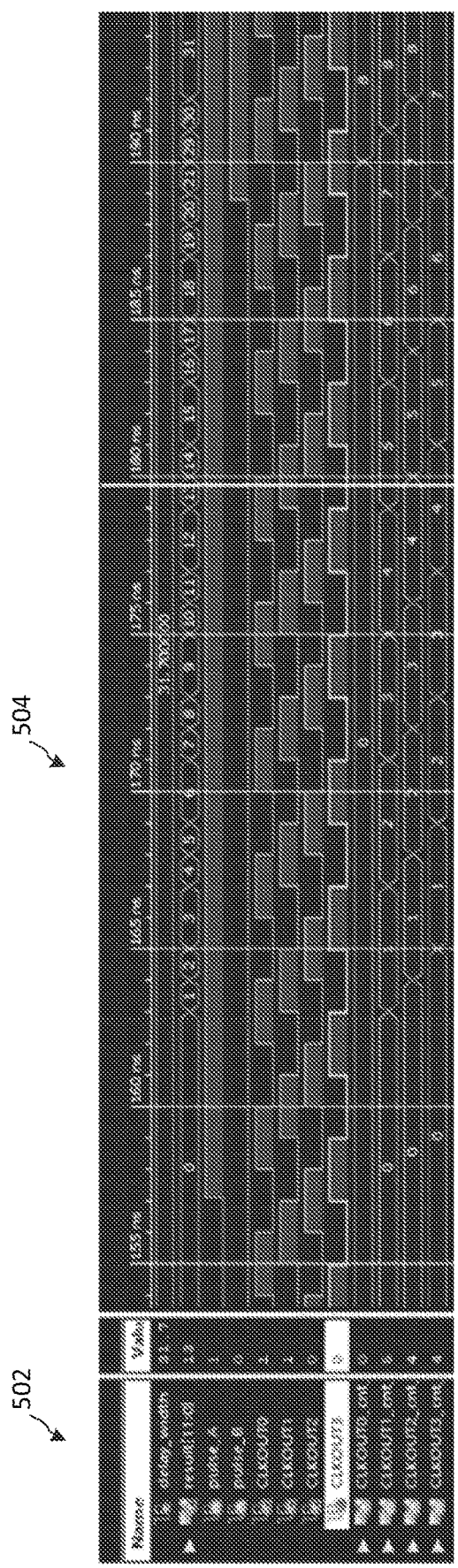
FIG. 9 is a chart illustrating example signal value output for two signals transmitted through an optic communication system including nodes such as the embodiments of FIG. 8, in accordance with one or more aspects of the disclosure.

FIG. 9 is a chart illustrating example signal value outputs for two signals transmitted through an optical communication system including nodes such as the embodiments of FIG. 8. The example of FIG. 9 may illustrate a measurement of signal transmission 502 with a 250-megahertz (MHz) clock on a processor or a logic unit (e.g., an FPGA). The chart 504 shows two signals pulse_A and pulse_B captured by a processor or a logic unit, and four sub-clock signals (CLKOUT0, CLKOUT1, CLKOUT2, CLKOUT3) generated by a processor or a logic unit with the same clock frequency at 250 MHZ but each sub-clock having a π/2 radian phase shift. In the example of FIG. 9, because there are 4 sub-clocks, each sub-clock is shifted 2π/4 radians (i.e., π/2 radians) or 360/4 degrees (i.e., 90 degrees). The chart shows that a delay shift of pulse A and pulse B may be resolved (e.g., showing a 31.7 ns time delay in the example) by counting numbers of these 4 sub-clock signals within rising edge of the two pulses pulse_A and pulse_B, with 1 ns measurement accuracy achieved.

Figure 10:
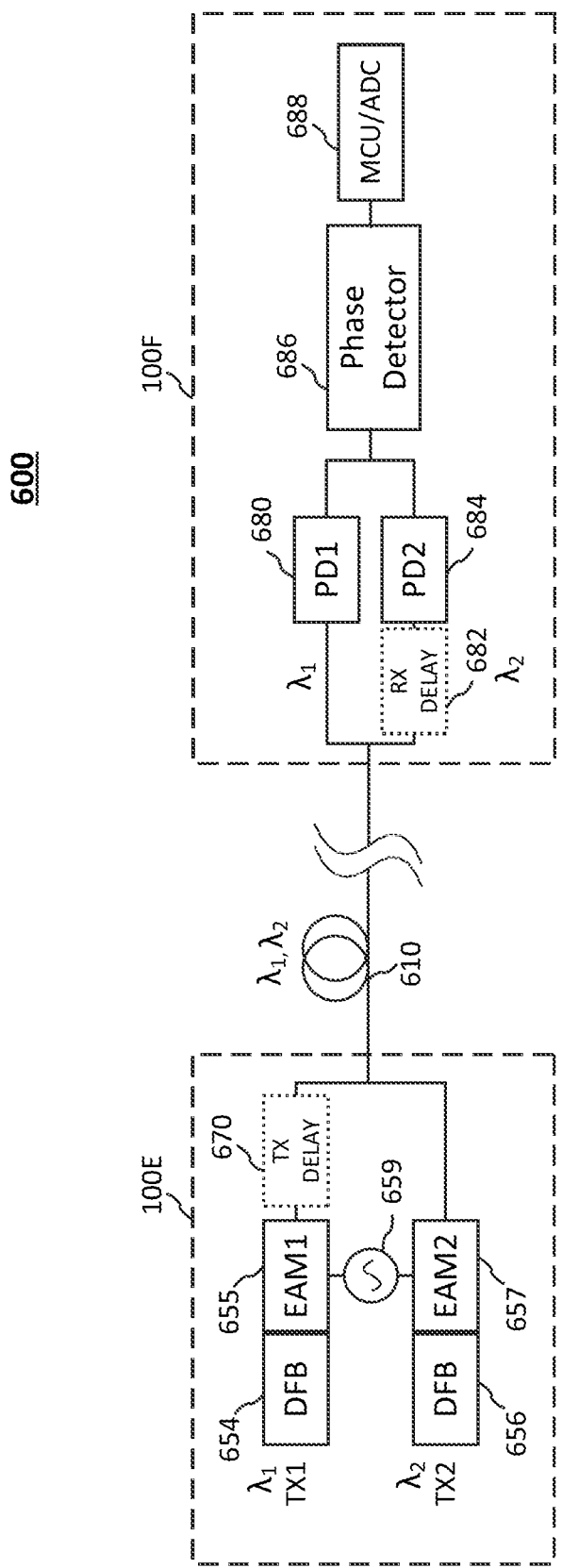
FIG. 10 is a diagram illustrating an exemplary fiber optic communication system including two nodes represented by modules such as user equipment 100 of FIG. 1 in communication using signal generators, in accordance with one or more aspects of the disclosure.

FIG. 10 shows an example embodiment 600 including delay elements in either or both of the transmitter and receiver portion of UEs. UE 100E may include a transmitter delay element 670. The delay element 670 is shown coupled to the EAM1 655, but the delay element 670 may be placed in any suitable location for a delay element. The UE 100E may include lasers (for example, distributed feedback lasers, DFB) 654, 656 (e.g., a laser diode, quantum cascade, laser, optical cable laser, etc.) that may be externally modulated by modulators 655, 657 (e.g., electro absorption modulator, etc.). The modulators 655, 657 may be driven by a signal generator 659 (e.g., a voltage generator).

UE 100F may include a receiver delay element 682. The delay element 682 is shown coupled to the photo detector PD2 684, but the delay element 682 may be placed in any suitable location for a delay element. The UE 100F may include photo detectors PD1 680, PD2 684 with the converted electrical signals multiplexed to a phase detector 686 with the phase difference converted to voltage, analog-to-digital converted by an ADC and processed by a microcontroller unit (MCU) 688. The ADC may be discrete elements or may be incorporated into the FPGA. The MCU 688 may process the signals to determine a phase shift. The MCU 688 may be discrete elements or may be incorporated into the FPGA. While the phase detector circuit is implemented as a combination of a serial photo detectors, and phase detector, the circuit may be implement using any suitable photo detector, phase detector circuits based on user preference or system design.

While the example shows UE 100E including the TX elements and UE 100F including the receive elements, the example is merely one possible embodiment. Either or both of the nodes UE 100E, 100F may include either or both of the elements shown for each node UE 100E, 100F.

Figure 11:
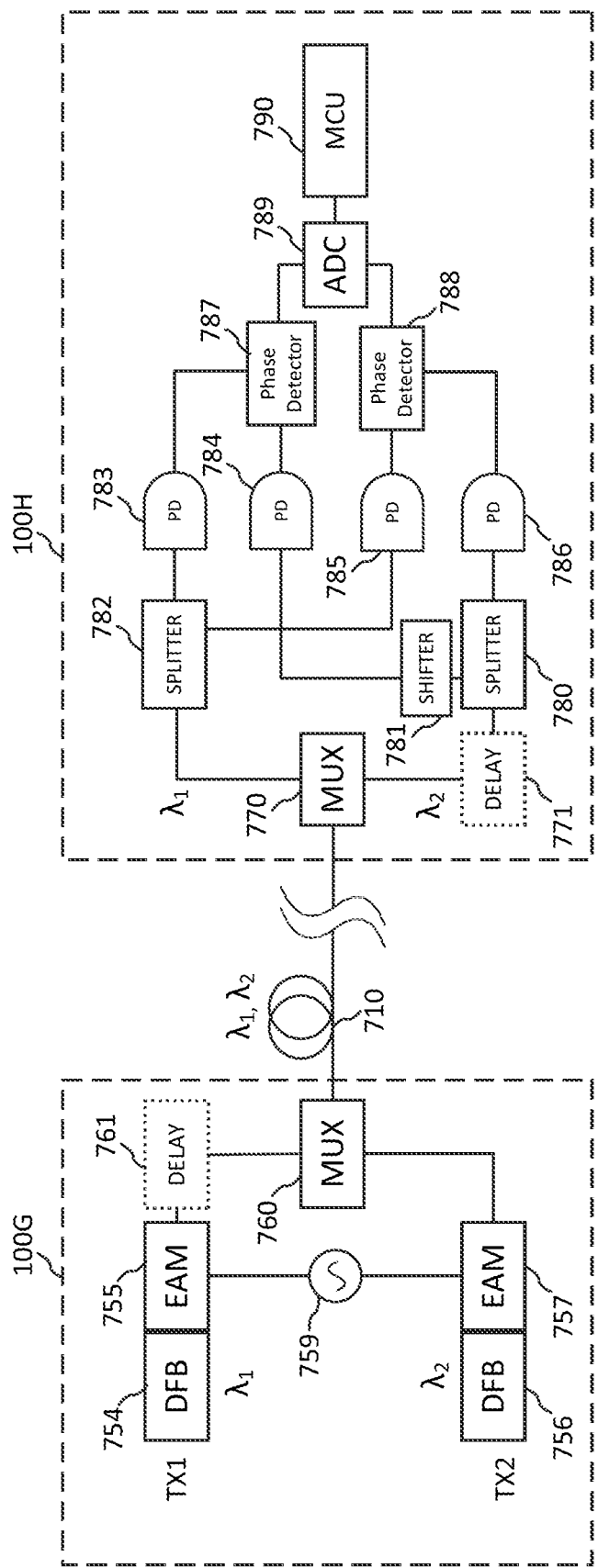
FIG. 11 is a diagram illustrating an exemplary fiber optic communication system including two nodes represented by modules such as user equipment 100 of FIG. 1 in communication using signal generators, in accordance with one or more aspects of the disclosure.

FIG. 11 is a diagram illustrating an exemplary fiber optic communication system 700 including two nodes. UEs 100G, 100H may be exemplary embodiments including signal generator 759. The example of FIG. 11 may include optional delay elements. Phase detectors may be included in the receiver to determine phases of the signal and a phase shifter 781 to degenerate positive and negative phase delay and avoid the ambiguity.

UE 100G may include a laser (for example distributed feedback laser) arrangement for TX1 754, 755 and TX2 756, 757. The lasers may be implemented using modulators (for example electro absorption modulators) 755, 757. The UE 100G may include a delay element 761. The UE 100G may include a multiplexer 760 to combine signals from EAM 755, 757. The communication system 700 may include transmission fiber 710 with different dispersion profile. The receiver node UE 100H may include a demultiplexer 770 to selectively output the multiplexed signals from UE 100G. The UE 100H may include an optional delay element 771. UE 100H may include splitters 780, 782 and photo detectors 783, 784, 786, 786 to convert optical signals to electrical signals and then multiplexed into phase detectors 787, 788 respectively. Phase detectors 787, 788 output phase differences to voltage signals and send the signals to an analog-to-digital converter 789. The MCU 790 may decode the signal and may determine signal characteristics including phase shifts and phase delays. While UEs 100G, 100H are described as including the transmitter or receiver elements, it is understood that UE embodiments may include either or both elements based on user prefer or system design.

In some embodiments, it may be beneficial to add an arbitrary amount of phase delay between two signals (e.g., using shifter 781). For example, two phase outputs may avoid the ambiguity between the positive and negative portions of a phase output (that is symmetrical). For example, given a voltage value representing a signal, it may not be possible to determine whether the phase delay is in the positive or negative phase shift (i.e., 0 to π radians or 0 to –π radians) due to the symmetry of the phase shift. With a second voltage graph that is offset it may be possible to determine the sign of the phase shift. For example, on the negative half, the left graph voltage is higher while for the positive half, the left graph voltage is lower.

Figure 12:
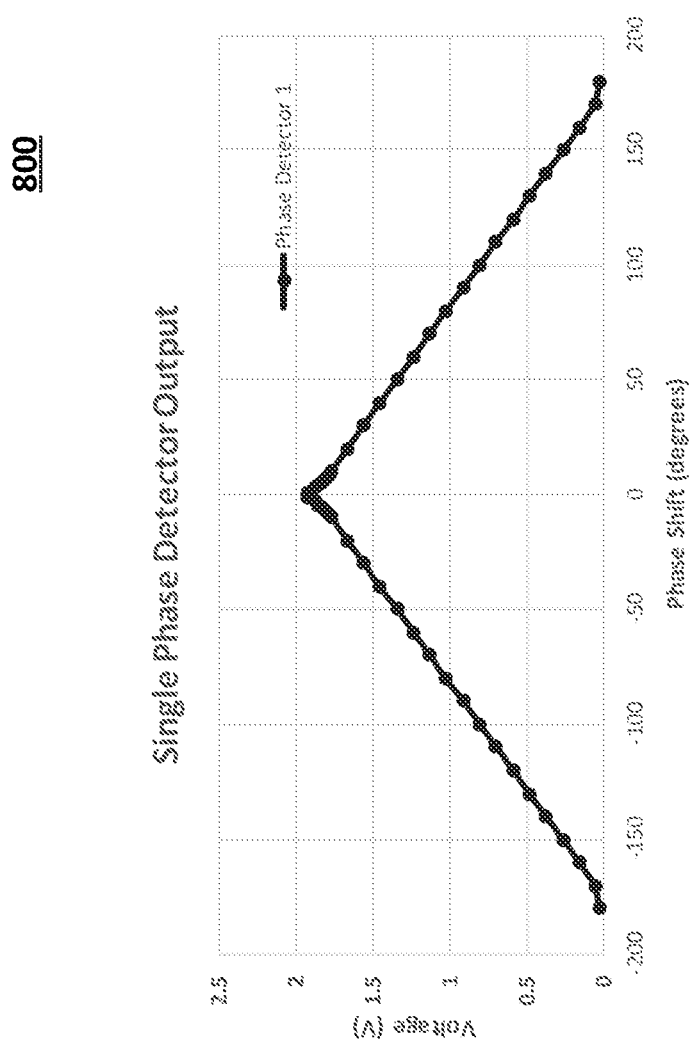
FIG. 12 is an example graph illustrating the relationship between voltage and phase shift of a signal transmitted through an optic communication system including nodes such as user equipment 100 of FIG. 1, in accordance with one or more aspects of the disclosure.

FIG. 12 is an example graph 800 illustrating the relationship between measured voltage and phase shift of two signals transmitted through an optic communication system including nodes such as UE 100 of FIG. 1, or UEs 100E, 100F of FIG. 10. The graph may be a relationship between phase shift (X-axis) and voltage (Y-axis). The graph may show a 360 degree range for the phase shift and voltage. The graph may be centered and symmetrical at zero degrees phase shift. The voltage at zero degrees phase shift may be approximately two volts. Because the voltage may be symmetrical about the Y-axis, given a voltage value, it may be difficult to determine whether the phase shift is in the positive or negative Y-axis half of the graph. For example, given a value of 1.5 volts, it may not be possible to determine whether the phase shift is around 40 degrees phase shift or –40 degrees phase shift. As such, the measurement may be limited to a 180 degree range of the phase delay of two signals.

Figure 13:
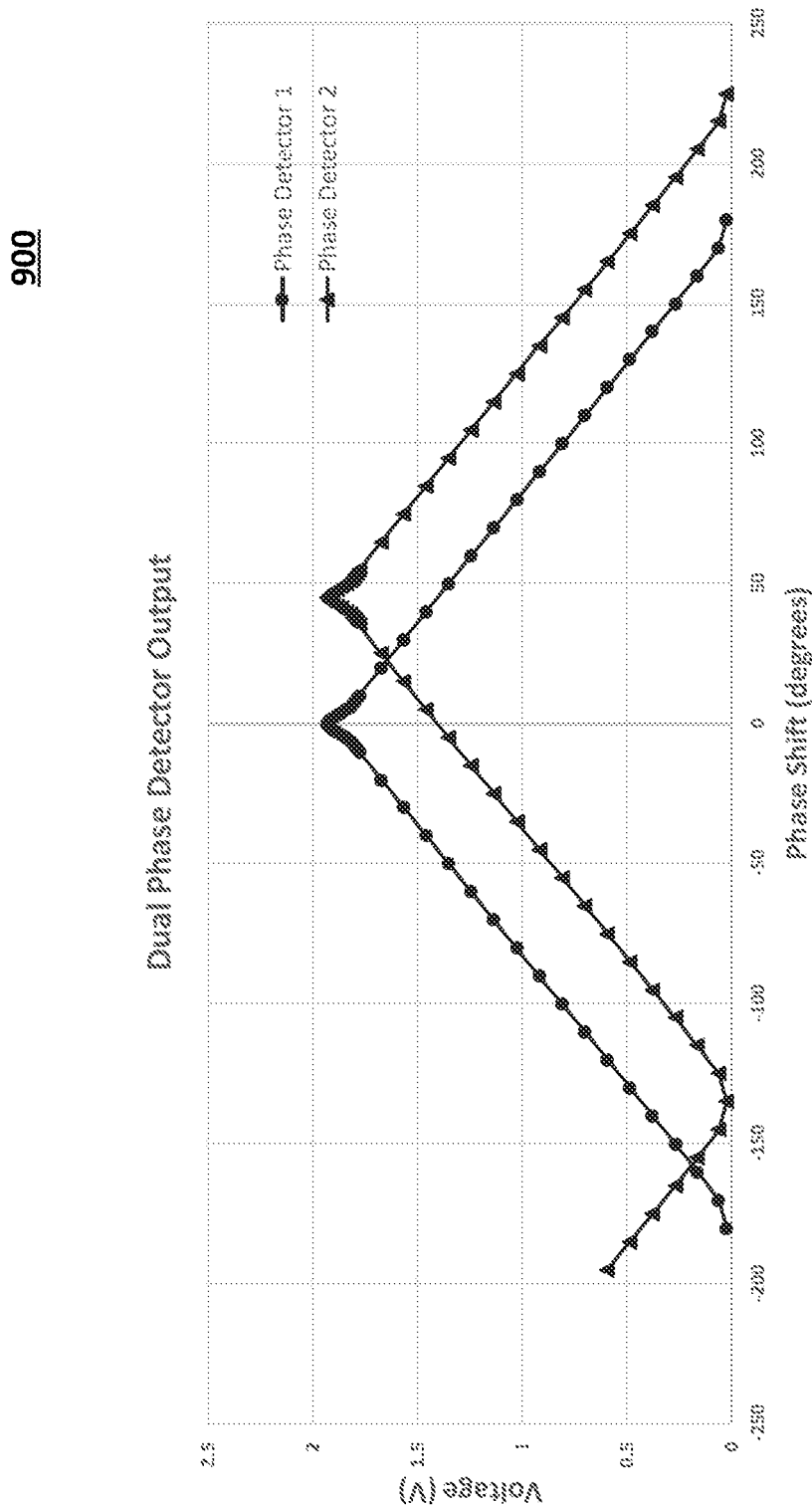
FIG. 13 is an example graph illustrating two relationships between voltage and phase shift of one or more signals transmitted through an optic communication system including nodes such as user equipment 100 of FIG. 1, in accordance with one or more aspects of the disclosure.

FIG. 13 is an example graph 900 illustrating two relationships between voltage and phase shift of two copies of two signals transmitted through an optic communication system including nodes such as user equipment 100 of FIG. 1 or UEs 100G, 100H of FIG. 11.

In one embodiment, the phase shift may represent the same signal delay with an added delay element. For example, the Phase Detector 1 (PD1, 788) curve may represent the relationship for the original signal delay. The Phase Detector 2 (PD2, 787) curve may represent the relationship for a signal delay with phase shifted. The graph of Phase Detector 1 may be the graph representing the embodiment illustrated in FIG. 11. The PD2 curve e.g., based on the shifter 781 output, may be shifted by about 45 degrees. With the two phase shift relationships, it may be possible to determine a phase shift in full 360 degree range given voltages of both PD1 and PD2. For example, when PD1 is at 1.4 volts and PD2 is at 0.9 volts, the phase shift is approximately −50 degrees. For example, when PD1 is at 1.4 volts and PD2 is at 1.7 volts, the phase shift is approximately 50 degrees. These two examples show that PD1 curve may have the same voltage at 1.4 volts yet it is possible to determine the phase shift because the addition of the PD2 curve resolves the ambiguity in the positive or negative half of the chart. Accordingly, as the examples illustrated, given voltage values, phase shifts (whether positive or negative) may be determined.

Figure 14:
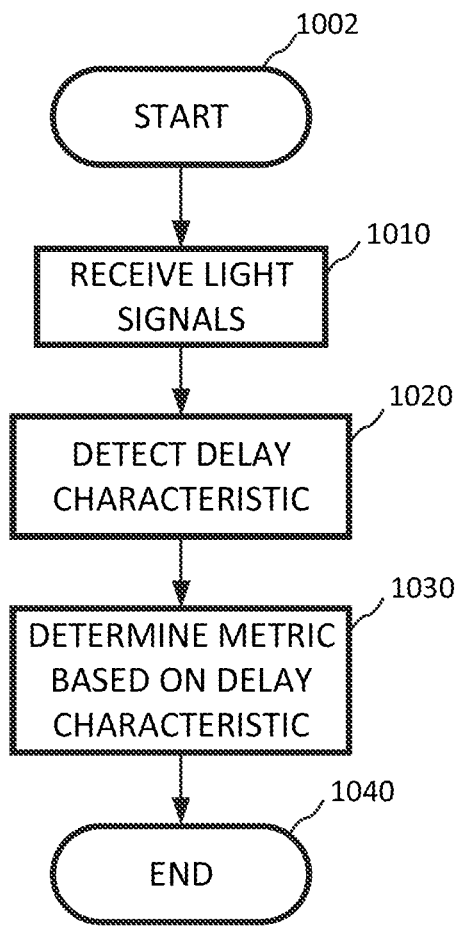
FIG. 14 is a flow chart illustrating an exemplary method for an optical signal transmission apparatus, in accordance with one or more aspects of the disclosure.

FIG. 14 is a flow chart illustrating an exemplary method 1000 for an optical signal transmission apparatus, in accordance with one or more aspects of the disclosure. For example, the method may illustrate dispersion monitoring by, e.g., module 100 of FIG. 1 or UE 100A and 100B of FIG. 2 in a fiber optic communication system.

The method may begin at step 1002 "START" and proceed to step 1010. At step 1010, the method may receive a set of light signals transmitted at one or more wavelengths of light. For example, the light signals may represent transmissions from one or more transmitters (e.g., lasers). In some embodiments, one or more of the wavelengths may be in the convention C-band. At step 1020, the method may detect, at a set of light detectors, a delay characteristic of each of the set of light signals. For example, the method may be performed at a UE that includes a set of phase detectors for detecting the phase characteristics of the incoming light signals, or the method may be performed a UE that includes a set of photodiode detectors for detecting time delay characteristics. At step 1030, the method may determine, at a processor, a metric based on detecting the delay characteristic. The metric may be a time or phase metric. For example, the time metric may be a time of flight delay for one or more signals. The metric may be a phase shift of the one or more signals. The method may end at step 1040. In some embodiments, the method may return to step 1010 and run continuously.

In some embodiments, the method may optionally determine parameter values associated with hardware characteristics. For example, when the method is performed by a UE, the method may determine characteristics such as dispersion, signal delay within the UE. The method may optionally transmit the parameter values to other nodes. For example, when the method is performed by an apparatus such as apparatus 100, the method may send the parameter values to other nodes that are in communication with the apparatus. The method may optionally include receiving other parameter values associated with other nodes. The method may optionally include controlling a dispersion compensation module based on the received parameter values.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. An optical signal transmission apparatus, the apparatus comprising:
    a plurality of optical transmitters, each optical transmitter configured for transmission of light signals at one or more wavelengths of light;
    an output port configured for transmission of the light signals through a span of optical fiber;
    an input port configured to receive other transmissions of light signals through the span of optical fiber;
    a plurality of light detectors, each light detector configured to detect a time delay or phase characteristic associated with the one or more wavelengths of light;
    a processor configured to determine a metric based on the detected time delay or phase characteristic; and
    a plurality of optical receivers configured for decoding light signals;
    a cross-connect configured to switchably couple the plurality of light transmitters to the plurality of optical receivers; and
    wherein the processor is further configured to determine a dispersion metric based on light signals transmitted through the cross-connect.

2. The apparatus of claim 1, wherein the metric is indicative of dispersion due to propagation of the one or more wavelengths of light.

3. The apparatus of claim 1 further comprising a phase shifter, wherein the processor is further configured to determine the metric based on the shifted phase value from the phase shifter and a non-shifted value from the plurality of light detectors.

4. The apparatus of claim 1, further comprising:
    a combining element comprising one of a multiplexer, a switch, or a combiner coupled to the plurality of optical transmitters and coupled to the output port; and
    a decoupling element comprising one of a demultiplexer, a switch, or a decoupler coupled to the plurality of light detectors and coupled to the input port.

5. The apparatus of claim 1, wherein the one or more wavelengths of light comprise a convention band (C-band).

6. The apparatus of claim 2, further comprising a supervisory channel module configured to send parameter information to other nodes and to receive other parameter information from the other nodes, the parameter information comprising hardware characteristics of the apparatus.

7. The apparatus of claim 6, further comprising a dispersion compensating module (DCM), wherein the processor is further configured to control the DCM based on at least one of the time metric, the phase shift metric, or the other parameter information.

8. The apparatus of claim 1, wherein determining the dispersion metric is further based on switching the cross-connect between at least two positions coupling different optical receivers to different optical transmitters providing different paths for light signals.

9. The apparatus of claim 1, further comprising a signal delay element coupled to one of the plurality of optical transmitters, wherein the signal delay element is configured to synchronize signal transmission of the optical transmitters.

10. An optical signal transmission apparatus, the apparatus comprising:
   a plurality of transmitter means, each transmitter means configured for transmission of light signals at one or more wavelengths of light;
   an output means configured for transmission of the light signals through a span of optical fiber;
   an input means configured to receive other transmissions of light signals through the span of optical fiber;
   a plurality of light detector means, each light detector means configured to detect a time delay or phase characteristic associated with the one or more wavelengths of light;
   a processing means configured to determine a metric based on the detected time delay or phase characteristic; and
   a plurality of receiver means configured for decoding light signals;
   a cross-connect means configured to switchably couple the plurality of transmitter means to the plurality of receiver means; and
   wherein the processing means is further configured to determine a dispersion metric based on light signals transmitted through the cross-connect means.

11. The apparatus of claim 10, further comprising:
   a combining means coupled to the plurality of transmitter means and coupled to the output means; and
   a decoupling means coupled to the plurality of light detector means and coupled to the input means.

12. The apparatus of claim 10, further comprising a supervisory channel communication means configured to send parameter information to other nodes and to receive other parameter information from the other nodes, the parameter information comprising hardware characteristics of the apparatus.

13. The apparatus of claim 12, further comprising a dispersion compensating means, wherein the processing means is further configured to control the dispersion compensating means based on at least one of the time metric, the phase characteristic, or the other parameter information.

14. The apparatus of claim 10, wherein the metric comprises is indicative of dispersion due to propagation of the one or more wavelengths of light.

15. The apparatus of claim 10, wherein determining the dispersion metric is further based on switching the cross-connect between at least two positions coupling different receivers to different transmitters providing different paths for light signals.

16. The apparatus of claim 10, further comprising a signal delay means coupled to one of the plurality of transmitter means, wherein the signal delay means is configured to synchronize signal transmission of the plurality of transmitter means.

17. A method of an optical signal transmission apparatus, the method comprising:
   receiving a plurality of light signals at a plurality of wavelengths of light;
   detecting, at a plurality of light detectors, a time delay or phase characteristic of each of the plurality of light signals;
   determining, at a processor, a metric based on detecting the time delay or phase characteristic; and
   determining parameter values associated with hardware characteristics of the apparatus;
   transmitting the parameter values to other nodes in communication with the apparatus;
   receiving other parameter values associated with the other nodes; and
   controlling a dispersion compensating module based on the received other parameter values.

18. The method of claim 17, wherein the metric is associated with a phase shift of the plurality of light signals propagating through an optical fiber at the plurality of wavelengths of light.

19. The method of claim 17, further comprising controlling a dispersion compensating module based on the detected phase characteristic.

* * * * *